United States Patent
Choi et al.

(10) Patent No.: US 11,095,844 B2
(45) Date of Patent: Aug. 17, 2021

(54) DISPLAY APPARATUS AND METHOD OF CONTROLLING THE SAME

(71) Applicant: SAMSUNG ELECTRONICS CO., LTD., Suwon-si (KR)

(72) Inventors: Woosub Choi, Suwon-si (KR); Doyoung Kim, Suwon-si (KR); Gucheol Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/685,362

(22) Filed: Nov. 15, 2019

(65) Prior Publication Data

US 2020/0162694 A1 May 21, 2020

(30) Foreign Application Priority Data

Nov. 15, 2018 (KR) .................. 10-2018-0140351

(51) Int. Cl.
| | |
|---|---|
| *H04N 5/58* | (2006.01) |
| *G09G 5/00* | (2006.01) |
| *H04N 5/57* | (2006.01) |
| *H04N 21/422* | (2011.01) |

(52) U.S. Cl.
CPC .......... *H04N 5/57* (2013.01); *H04N 21/42204* (2013.01); *H04N 21/42221* (2013.01)

(58) Field of Classification Search
CPC .......... G02B 27/01; G06F 3/033; G09G 5/08; G09G 5/00; G02F 1/133; H04N 5/58; H04N 5/57

See application file for complete search history.

(56) References Cited

U.S. PATENT DOCUMENTS

| | | | |
|---|---|---|---|
| 2003/0071932 A1 | 4/2003 | Tanigaki | |
| 2007/0222741 A1* | 9/2007 | Itaya | G09G 3/3406 345/102 |
| 2009/0033676 A1* | 2/2009 | Cybart | G09G 3/2003 345/589 |
| 2010/0013849 A1* | 1/2010 | Yun | G09G 3/3406 345/589 |
| 2011/0304532 A1 | 12/2011 | Suh et al. | |

(Continued)

FOREIGN PATENT DOCUMENTS

| | | |
|---|---|---|
| JP | 2002094955 A | 3/2002 |
| JP | 2009092724 A | 4/2009 |

(Continued)

OTHER PUBLICATIONS

International Search Report (PCT/ISA/210) and Written Opinion (PCT/ISA/237) dated Mar. 13, 2020 from the International Searching Authority in application No. PCT/KR2019/015345.

*Primary Examiner* — Pegeman Karimi
(74) *Attorney, Agent, or Firm* — Sughrue Mion, PLLC

(57) ABSTRACT

Disclosed are a display apparatus and a method of controlling the same. The display apparatus includes: a display including a panel configured to display an image on a screen; an optical sensor placed on a side of the panel opposite to the screen of the panel, and configured to detect an optical signal; and a processor configured to control the panel to display the image on the screen, and perform an operation based on a state of the panel and a detection value obtained by the optical sensor.

19 Claims, 16 Drawing Sheets

(56) References Cited

U.S. PATENT DOCUMENTS

2012/0146973 A1* 6/2012 Kaji ................ G02F 1/1336
345/207
2015/0116507 A1 4/2015 Sagerian et al.
2015/0261384 A1* 9/2015 Sohn ................ G06F 3/0421
345/175

FOREIGN PATENT DOCUMENTS

| JP | 5653239 B2 | 1/2015 |
| KR | 1020150106232 A | 9/2015 |
| KR | 10-1793281 B1 | 11/2017 |

* cited by examiner

DISPLAY APPARATUS AND METHOD OF CONTROLLING THE SAME

CROSS-REFERENCE TO RELATED THE APPLICATION(S)

This application is based on and claims priority under 35 U.S.C. § 119 to Korean Patent Application No. 10-2018-0140351, filed on Nov. 15, 2018, in the Korean Intellectual Property Office, the disclosure of which is incorporated by reference herein in its entirety.

BACKGROUND

1. Field

The disclosure relates to a display apparatus and a method of controlling the same and, more particularly, to a display apparatus that can detect an optical signal, and a method of controlling the same.

2. Description of the Related Art

Nowadays, a bezel of a television (TV) or the like display apparatus is getting thinner and thinner. As the bezel becomes thinner, it is advantageous to increase an immersion level of a user in an image displayed on a screen of the display apparatus.

Meanwhile, such a downsizing may change an arrangement of parts placed in a related art bezel. For example, an infrared (IR) sensor, an illumination sensor, a color sensor and the like optical sensors may be moved to and placed in the interior of the display apparatus. Therefore, there is a need for a method of detecting not only an optical signal from the interior of the display apparatus, but also an optical signal from a display panel or an optical signal from the outside of the display apparatus even though the optical sensors are placed in the interior of the display apparatus.

SUMMARY

Provided is a display apparatus with an optical sensor placed in an interior thereof, and more particularly, a display apparatus that can detect light from the inside, the outside or a panel thereof through an optical sensor and perform an operation based on the light detection even though the optical sensor is placed in an interior of the display apparatus.

Additional aspects will be set forth in part in the description which follows and, in part, will be apparent from the description, or may be learned by practice of the presented embodiments.

In accordance with an aspect of the disclosure, a display apparatus includes: a display including a panel configured to display an image on a screen; an optical sensor placed on a side of the panel opposite to the screen of the panel, and configured to detect an optical signal; and a processor configured to control the panel to display the image on the screen, and perform an operation based on a state of the panel and a detection value obtained by the optical sensor.

The display may further include a backlight unit configured to output light to the panel; and the processor may be further configured to control the backlight unit to change a quantity of light output from the backlight unit, and to perform the operation based on a state of the backlight unit and the detection value obtained by the optical sensor.

The processor may be further configured to control the state of the panel to change light transmissivity of the panel, to correct the detection value obtained by the optical sensor based on the light transmissivity of the panel, and to perform the operation based on the corrected detection value.

The processor may be further configured to identify the detection value obtained by the optical sensor as a detection value about light from an exterior of the display apparatus, based on the panel controlled to switch over from a first state to a second state having higher light transmissivity than the first state and the backlight unit controlled to decrease the quantity of the output light when the optical signal is detected, and to perform the operation based on the identification.

The processor may be further configured to identify the detection value obtained by the optical sensor as a detection value about light from an exterior of the display apparatus and light from the image, based on the panel controlled to display the image on the screen thereof and the backlight unit controlled to decrease the quantity of the output light when the optical signal is detected, and to perform the operation based on the identification.

The processor may be further configured to identify the detection value obtained by the optical sensor as a detection value about light from an exterior and an interior of the display apparatus and light from the image, based on the panel controlled to display the image on the screen thereof and the backlight unit controlled not to decrease the quantity of the output light when the optical signal is detected, and to perform the operation based on the identification.

The processor may be further configured to correct a second detection value obtained by the optical sensor while the panel displays no images on the screen, based on a first detection value obtained by the optical sensor while the panel displays the image on the screen.

The optical sensor may include an infrared (IR) sensor; and the processor may be further configured to perform the operation according to an IR signal detected by the IR sensor, based on the panel controlled to switch over to the second state and the backlight unit controlled to decrease the quantity of the output light.

The processor may be further configured to control the panel to switch over from the first state to the second state and to control the backlight unit to decrease the quantity of the output light, for a predetermined period of time corresponding to a frame rate of the image displayed on the screen.

The processor may be further configured to control the panel to switch over from the first state to the second state and to control the backlight unit to decrease the quantity of the output light, on a predetermined cycle.

The processor may be further configured to control a first region of the panel to display the image based on an image signal, and to control a second region of the panel to switch over from the first state to the second state while the first region displays the image in the first state.

The processor may be further configured to shorten the predetermined cycle based on the IR sensor detecting the IR signal.

The processor may be further configured to increase the predetermined period of time based on the IR sensor detecting the IR signal.

In accordance with another aspect of the disclosure, a method of controlling a display apparatus including a display with a panel, includes: controlling the panel to display an image on a screen; and performing an operation based on a state of the panel and a detection value obtained by an optical sensor placed on a side of the panel opposite to the screen of the panel.

The performing the operation may include controlling to change a quantity of light output from a backlight unit of the display, and performing the operation based on a detection value obtained by the optical sensor and a state of the backlight unit.

The performing the operation may include controlling the state of the panel to change light transmissivity of the panel, correcting the detection value obtained by the optical sensor based on the light transmissivity of the panel, and performing the operation based on the corrected detection value.

The performing the operation may include identifying the detection value obtained by the optical sensor as a detection value about light from an exterior of the display apparatus, based on the panel controlled to switch over from a first state to a second state having higher light transmissivity than the first state and the backlight unit controlled to decrease the quantity of the output light, and performing the operation based on the identification.

The performing the operation may include identifying the detection value obtained by the optical sensor as a detection value about light from an exterior of the display apparatus and light from the image, based on the panel controlled to display the image on the screen thereof and the backlight unit controlled to decrease the quantity of the output light, and performing the operation based on the identification.

The performing the operation may include identifying the detection value obtained by the optical sensor as a detection value about light from an exterior and an interior of the display apparatus and light from the image, based on the panel controlled to display the image on the screen thereof and the backlight unit controlled not to decrease the quantity of the output light, and performing the operation based on the identification.

In accordance with another aspect of the disclosure, a non-transitory computer-readable recording medium has recorded thereon at least one instruction executable by a processor to perform a method of controlling a display apparatus, the method including: controlling a panel of the display apparatus to display an image on a screen; and performing an operation based on a state of the panel and a detection value obtained by an optical sensor placed on a side of the panel opposite to the screen of the panel.

The performing the operation may include controlling to change a quantity of light output from a backlight unit of the display, and performing the operation based on a detection value obtained by the optical sensor and a state of the backlight unit.

The performing the operation may include controlling the state of the panel to change light transmissivity of the panel, correcting the detection value obtained by the optical sensor based on the light transmissivity of the panel, and performing the operation based on the corrected detection value.

The performing the operation may include identifying the detection value obtained by the optical sensor as a detection value about light from an exterior of the display apparatus, based on the panel controlled to switch over from a first state to a second state having higher light transmissivity than the first state and the backlight unit controlled to decrease the quantity of the output light, and performing the operation based on the identification.

The performing the operation may include identifying the detection value obtained by the optical sensor as a detection value about light from an exterior of the display apparatus and light from the image, based on the panel controlled to display the image on the screen thereof and the backlight unit controlled to decrease the quantity of the output light, and performing the operation based on the identification.

The performing the operation may include identifying the detection value obtained by the optical sensor as a detection value about light from an exterior and an interior of the display apparatus and light from the image, based on the panel controlled to display the image on the screen thereof and the backlight unit controlled not to decrease the quantity of the output light, and performing the operation based on the identification.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
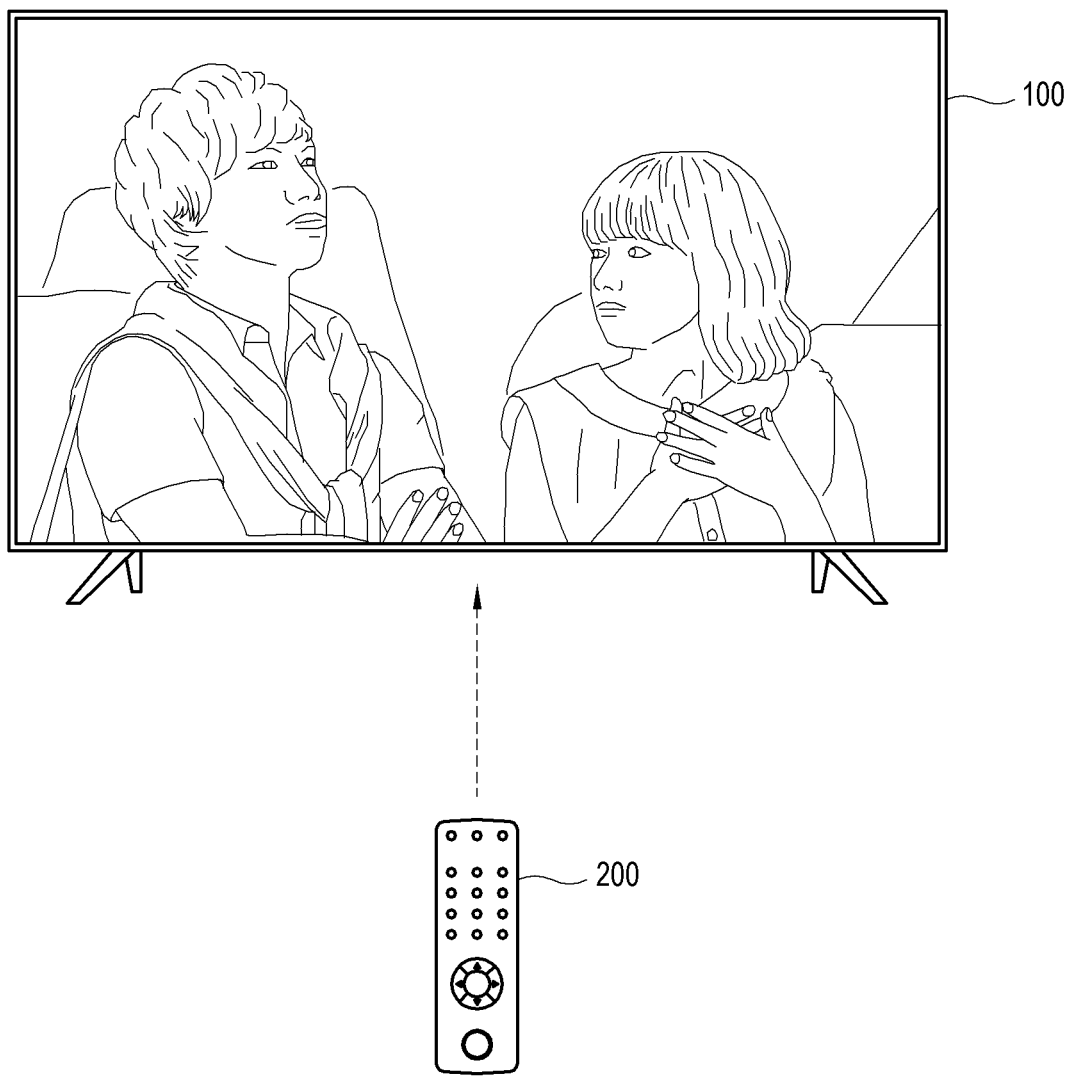
FIG. 1 is a conceptual view of a display apparatus according to an embodiment.

Below, certain embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the present inventive concept(s) and the key configurations and functions.

In the following description, the terms "first," "second," etc., are only used to distinguish one element from another, and singular forms are intended to include plural forms unless otherwise mentioned contextually. In the following description, it will be understood that terms "comprise," "include," "have," etc., do not preclude the presence or addition of one or more other features, numbers, steps, operations, elements, components or combination thereof. In addition, a "module" or a "portion" may perform at least one function or operation, be achieved by hardware, software or combination of hardware and software, and be modularized into at least one processor. Further, in the following description, at least one among a plurality of elements refer to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer to a dedicated processor (e.g., an embedded processor) for performing the corresponding operations, or a generic-purpose processor (e.g., a central processing unit (CPU) or an application processor) for performing the corresponding operations by executing one or more software programs stored in a memory device. Hereinafter, it is understood that expressions such as "at least one of," when preceding a list of elements, modify the entire list of elements and do not modify the individual elements of the list. For example, the expression "at least one of [A], [B], and [C]" means only A, only B, only C, A and B, B and C, A and C, or A, B, and C.

FIG. 1 illustrates a display apparatus 100 according to an embodiment. The display apparatus 100 may, for example, be a television (TV), in particular, a TV of which a bezel is very thin. Further, a display apparatus 100 may, for example, be a video wall, an electronic frame, a digital billboard, a large format display (LFD), a digital signage, a smartphone, a tablet computer, a mobile phone, a portable multimedia device, a smartwatch, a head-mounted display or the like wearable device, a computer, a multimedia player, or the like apparatus capable of outputting an image based on content. However, the display apparatus 100 is not limited to these examples, and may include any apparatus capable of displaying an image.

A user of the display apparatus 100 may remotely control the display apparatus 100 through a remote controller 200. The remote controller 200 may employ an infrared (IR) signal to transmit a control command to the display apparatus 100, although it is understood that embodiments are not limited thereto. For example, according to another embodiment, the remote controller 200 may employ an IR signal as well as a Radio Frequency (RF) signal.

Figure 2:
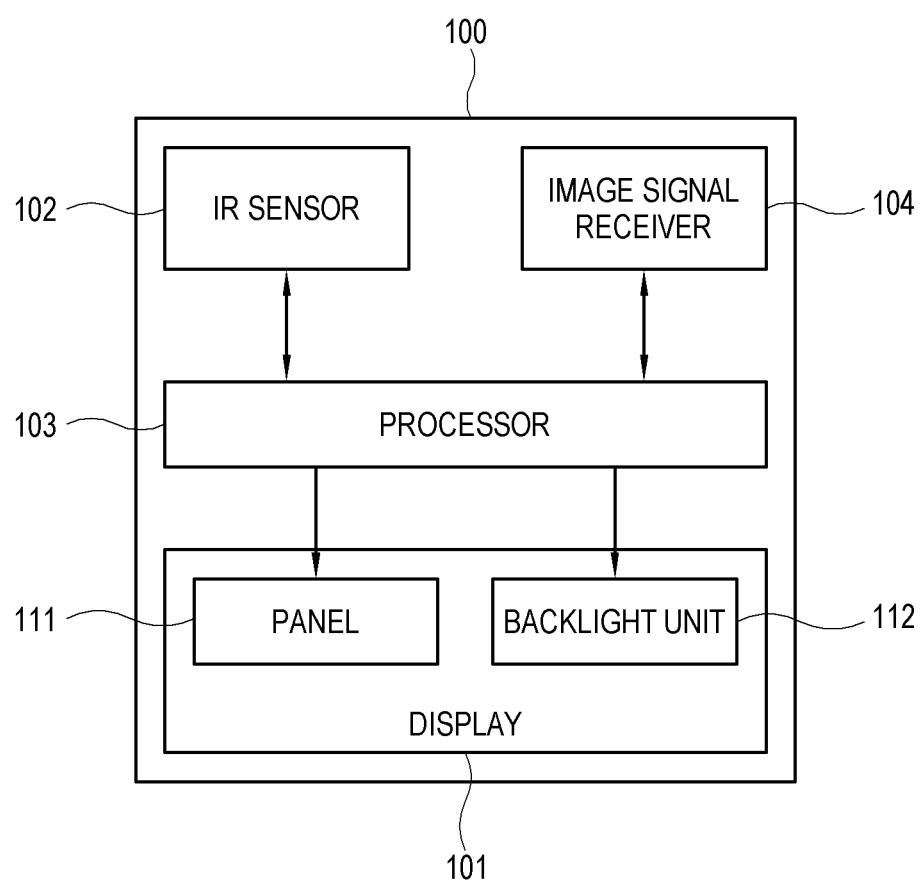
FIG. 2 is a block diagram of a display apparatus according to an embodiment.

FIG. 2 is a block diagram of a display apparatus 100 according to an embodiment. Referring to FIG. 2, the display apparatus 100 includes a display 101, an IR sensor 102, and a processor 103 (e.g., at least one processor). However, the configuration of the display apparatus 100 shown in FIG. 2 is merely an example, and the display apparatus according to various other embodiments may be actualized by alternative elements. For example, the display apparatus according to another embodiment may include other elements in addition to the elements shown in FIG. 2 or may exclude some elements from those shown in FIG. 2.

Further, the display apparatus 100 according to an embodiment may include an IR sensor 102, although one or more other embodiments are not limited thereto. For example, the display apparatus 100 may include an optical sensor including a color sensor, an illumination sensor, a brightness sensor, etc. Below, the configuration with the IR sensor 102 will first be described, followed by a description of the configuration with the optical sensor including the color sensor, the illumination sensor, etc. However, this is merely for convenience of description. In the following, the operation and description related to the IR sensor 102 may be also be applicable to the optical sensor.

The display 101 may display an image. The display 101 may be actualized without limitations by various display methods such as, for example, liquid crystal, a light emitting diode (LED), an organic light emitting diode (OLED), an active matrix OLED (AMOLED), a micro LED, a carbon nano-tube, nano-crystal, etc. In a case of the method of using the liquid crystal, the display 101 includes a liquid crystal display (LCD) panel 111, a backlight unit 112 (e.g., backlight) for supplying light to the LCD panel 111, a panel driver for driving the LCD panel 111, etc. According to another embodiment, the display 101 may be actualized by an OLED panel 111 that can emit light in itself without the backlight unit.

The IR sensor 102 may be configured to detect an IR signal around the display apparatus 100. In particular, the IR sensor 102 may detect the IR signal emitted from a remote controller 200, so that the display apparatus 100 can operate based on a control command included or encoded in the IR signal.

The processor 103 may process an image signal. There are no limits to the kinds of image processing processes performed by the processor 103. For example, the image processing performed by the processor 103 may include at least one of: demultiplexing for dividing an input stream into sub streams of video, audio and appended data; decoding corresponding to an image format of an image stream; deinterlacing for converting an interlaced type of an image stream into a progressive type; scaling for adjusting an image stream to have a preset resolution; noise reduction for improving image quality; detail enhancement; frame refresh rate conversion; etc.

The processor 103 may perform control for operating general elements of the display apparatus 100. The processor 103 may execute a control program (or at least one instruction). In this case, the display apparatus 100 may further include a nonvolatile memory in which the control program is installed, and a volatile memory in which at least a part of the installed control program is loaded. Further, the control program may be stored in an electronic apparatus other than the display apparatus 100, and/or in an external memory or storage.

The control program may include a program(s) achieved in the form of at least one of a basic input/output system (BIOS), a device driver, an operating system, firmware, a platform, and an application program. According to an embodiment, the application program may be previously installed or stored in the display apparatus 100 when the display apparatus 100 is manufactured, or may be installed in the display apparatus 100 on the basis of application program data received from the outside when used in the future. The application data may be, for example, downloaded from an application market and the like external server to the display apparatus 100, but is not limited thereto. Meanwhile, the processor 103 may be actualized in the form of a device, a software (S/W) module, a circuit, a chip, or a combination thereof. Below, operation of executing and implementing the control program by the processor 101 according to an embodiment may for convenience be described as operation of the processor 103 without mentioning the control program.

The processor 103 may for example control the display 101 to display an image, and the IR sensor 102 to detect an IR signal. Further, the processor 103 may perform operation based on a control command included in an IR signal detected by the IR sensor 102. In the display apparatus 100 shown in FIG. 2, both the process and control are performed in one processor 103. However, this is merely an example, and a display apparatus according to an alternative embodiment may include a separate controller or at least additional processor in addition to the processor 103.

The display apparatus 100 according to an embodiment may further include an image signal receiver 104.

The image signal receiver 104 receives an image signal. The image signal receiver 104 may include a tuner for receiving an image signal such as a broadcast signal. The tuner may be tuned to a certain channel selected by a user among a plurality of channels and receive a broadcast signal corresponding to the tuned channel. Alternatively, the image signal receiver 104 may receive an image signal from an external apparatus such as a camera, a server, a universal serial bus (USB) storage device, a digital versatile disc (DVD), a computer, a set-top box, a multimedia player, a media source device, a media server, etc.

The image signal receiver 104 may include a communicator configured to communicate with an external apparatus and receive an image signal. The communicator may be variously configured according to external apparatuses. For example, the communicator may include a connection unit for a wired communication, and the connection unit may transmit/receive a signal/data according to standards such as high definition multimedia interface (HDMI), HDMI-consumer electronics control (CEC), USB, component, etc., and include at least one connector or terminal according to the standards. The communicator may perform a wired communication with a plurality of servers through a wired local area network (LAN). The communicator may be actualized by various communication methods besides the communication unit including the connector or terminal for the wired communication. For example, the communicator may be configured to perform one or more communications among Wi-Fi, Wi-Fi Direct, Ethernet, Bluetooth, Bluetooth low energy (BLE), serial port profile (SPP), Zigbee, IR communication, radio control, ultra-wide band (UWB), wireless USB, and near field communication (NFC). The communicator may be actualized in the form of a device, a S/W module, a circuit, a chip, etc.

Figure 3:
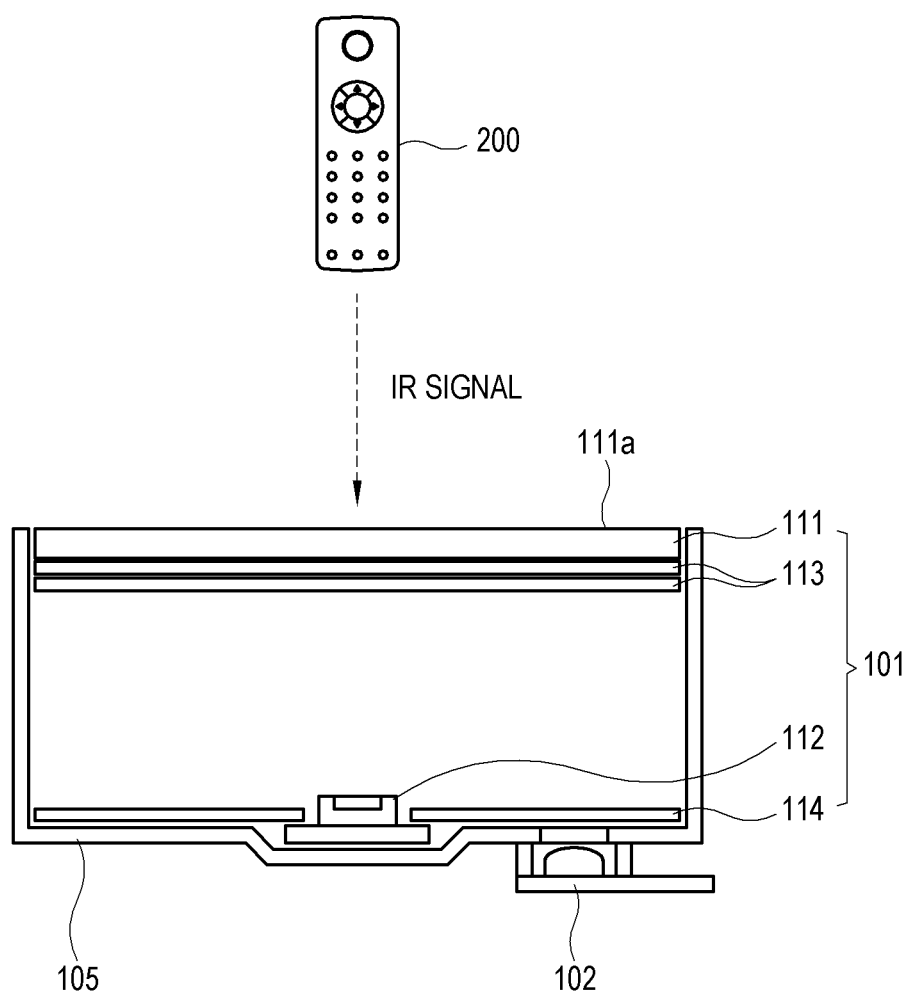
FIG. 3 is a cross-sectional view of a display apparatus according to an embodiment.

FIG. 3 is a cross-sectional view of the display apparatus 100 according to an embodiment.

The display 101 of the display apparatus 100 according to an embodiment includes a panel 111 for displaying a screen 111a. There are no limits to the method of actualizing the panel 111. For example, when the display 101 is actualized by an LCD, the panel 111 may be an LCD panel. When the display 101 is actualized by an OLED, the panel 111 may be an OLED panel. When the display 101 is actualized by a micro LED, the panel 111 may be a micro LED panel.

The display 101 may further include other elements in addition to the panel 111. For example, when the display 101 is actualized by the LCD, the display 101 may further include a backlight unit 112, an optical sheet 113, a reflection sheet 114, etc.

The display apparatus 100 may further include a housing 105 to form an outer appearance of the display apparatus 100 and accommodate the display 101.

Figure 4:
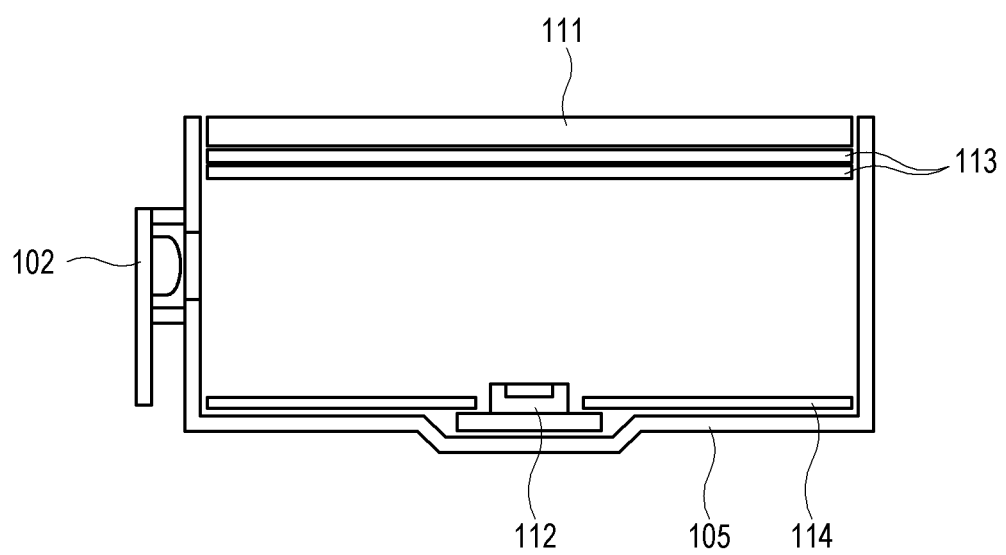
FIGS. 4 to 6 are cross-sectional views of a display apparatus according to another embodiment.
Figure 6:
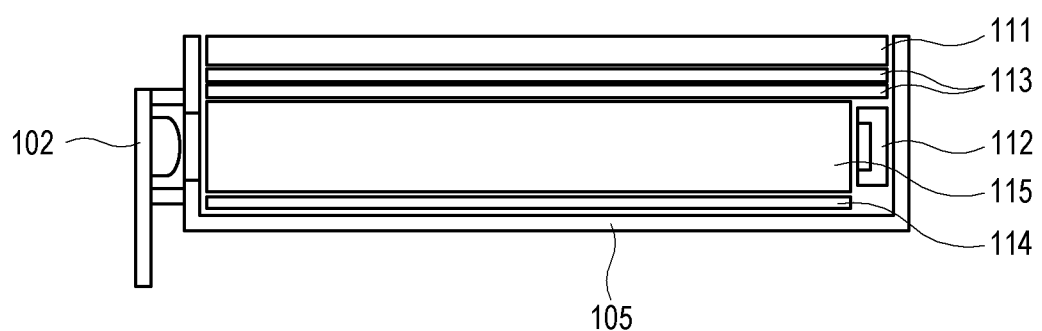

The IR sensor 102 of the display apparatus 100 according to an embodiment is provided on an opposite side of the screen 111a of the panel 111, and detects the IR signal passing through the panel 111. For example, the IR sensor 102 may detect the IR signal emitted from the remote controller 200 and passing through the panel 111 when a user of the display apparatus 100 presses a button while pointing the remote controller 200 toward the screen 111a of the display 101. To detect the IR signal, the IR sensor 102 may be placed on the opposite side of the panel 111 (or in the vicinity thereof) in the housing 105 and be directed toward the panel 111. However, there are no limits to the position and orientation of the IR sensor 102. Alternatively, the IR sensor 102 may have any position and orientation that can detect the IR signal passing through the panel 111. For example, as shown in FIG. 4 or 6, the IR sensor 102 may be placed in a lateral portion of the panel 111 (or in the vicinity thereof) in the housing 105 and directed toward the interior of the display apparatus 100.

Figure 5:
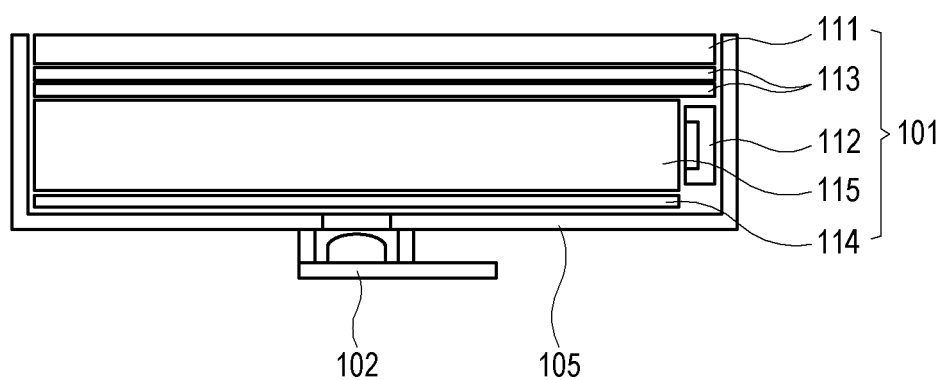

Further, when the display 101 includes the backlight unit 112, there are no limits to the position and orientation of the backlight unit 112. For example, the backlight unit 112 may, as shown in FIG. 3 or 4, be placed at a predetermined position (for example, at a center portion) on the opposite side of the panel 111 in the housing 105 and directed toward the panel 111. Alternatively, the backlight unit 112 may, as shown in FIG. 5 or 6, be placed at a lateral portion of the panel 111 (or in the vicinity thereof) in the housing 105 and directed toward the interior of the display apparatus 100. When the backlight unit 112 is placed in the lateral portion of the panel 111 in the housing 105 (or in the vicinity thereof), the backlight unit 112 may include a light guide plate 115.

As described above, the IR sensor 102 can detect external light of the display apparatus 100 and operate based on the light detection even though the IR sensor 102 is placed inside the display apparatus 100.

Meanwhile, in the foregoing embodiment, when a user of the display apparatus 100 presses a button of the remote controller 200 by pointing the remote controller 200 toward the screen 111a of the panel 111 of the display 101 while an image is being displayed on the panel 111 of the display 101, the IR sensor 102 placed on the opposite side of or behind the screen 111a of the panel 111 may have low receiving sensitivity for the IR signal of the remote controller 200. This is because the path of the IR signal emitted from the remote controller 200 may interfere with the panel 111 that is displaying an image. In other words, the panel 111 that is displaying an image may not have high light transmissivity.

To increase the receiving sensitivity for the IR signal, the processor 103 of the display apparatus 100 may control the panel 111 to increase the light transmissivity. Specifically, the panel 111 has a first state and a second state in which the light transmissivity is higher than that of the first state, and the processor 103 may control the panel 111 to switch over from the first state to the second state and operate based on the IR signal detected by the IR sensor 102 while the panel 111 is in the second state.

As an example of a method by which the processor 103 controls the panel 111 to switch over from the first state to the second state, when the display 101 is actualized by the LCD, the processor 103 may control the liquid crystal of the LCD panel 111 in response to a signal for controlling the liquid crystal so that the liquid crystal of the panel 111 is oriented perpendicularly to the screen 111a (hereinafter, referred to as an "OPEN signal"). It is understood, however, that this is merely an example, and one or more other embodiments are not limited to the liquid crystal of the panel 111 being controlled to be oriented "perpendicularly" to the screen 111a. For example, according to another embodiment, the panel 111 may be switched over to the second state with a different orientation of the liquid crystal. Further, the liquid crystal of the LCD panel 111 may be controlled not by the processor 103, but by a display driver for driving the panel 111. For example, the display driver may control the state or orientation of the liquid crystal based on the image signal. Specifically, the display driver may control the liquid crystal to increase in a gradient with respect to horizontality as the number of pixel value becomes larger based on the image signal, and control the liquid crystal to decrease in a gradient with respect to horizontality as the number of pixel value becomes smaller based on the image signal. Alternatively, the display driver may be directly controlled to control the state of the liquid crystal regardless of the image signal. Below, that the liquid crystal of the panel 111 is controlled by the display driver may for convenience be described as the liquid crystal of the panel 111 being controlled by the processor 103.

As another example of a method by which the processor 103 controls the panel 111 to switch over from the first state to the second state, when the display 101 is actualized by the OLED, the processor 103 may control the OLED panel 111 to become transparent. Alternatively, when the display 101 is actualized by the micro LED, the processor 103 may control the micro LED panel 111 to become transparent. However, the method by which the processor 103 controls the panel 111 to switch over from the first state to the second state is not limited to these examples, and may include any control method of increasing the light transmissivity of the panel 111. For convenience of description, the below descriptions will be provided on the assumption that the display 101 is actualized by the LCD, although it is understood that embodiments are not limited thereto.

Figure 7:
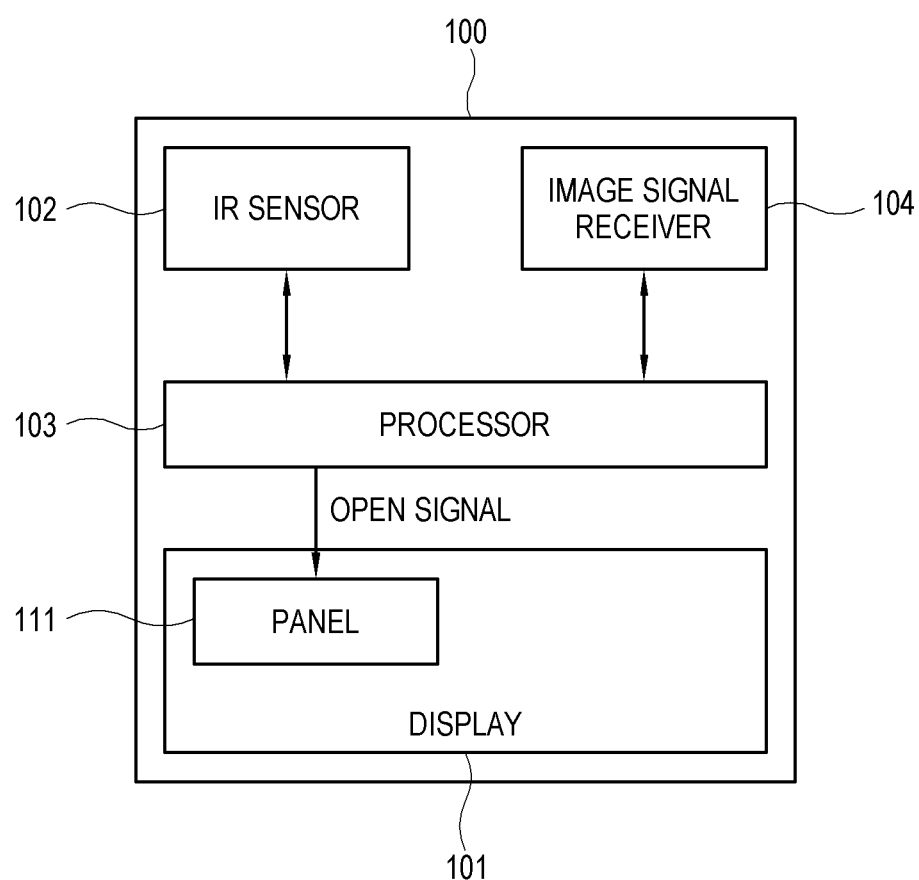
FIGS. 7 and 8 illustrate an example of a method by which a processor of a display apparatus according to an embodiment controls a panel.
Figure 8:
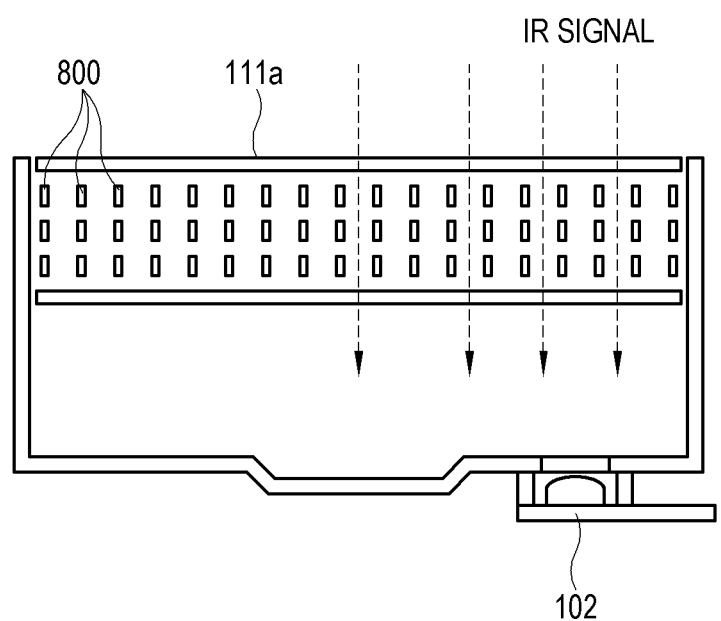

FIGS. 7 and 8 illustrate an example of a method by which the processor 103 controls the panel 111 to switch over from the first state to the second state when the display 101 of the display apparatus 100 according to an embodiment is actualized by the LCD.

In the present embodiment, the processor 103 transmits a signal for controlling liquid crystal 800 of the panel 111, i.e., an OPEN signal, to the panel 111 so that the liquid crystal 800 of the panel 111 can be oriented perpendicularly to the screen 111a of the panel 111, thereby controlling the panel 111 to switch over from the first state to the second state having higher light transmissivity than the first state. In a case that the panel 111 is controlled by the OPEN signal, as shown in FIG. 8, the liquid crystal 800 of the panel 111 is oriented perpendicularly to the screen 111a, allowing the IR signal to more easily pass through the panel 111 than a case in which the liquid crystal 800 of the panel 111 is not oriented perpendicularly to the screen 111a of the panel 111. Therefore, the IR signal, which reaches the IR sensor 102 provided on the opposite side of the screen 111a of the panel 111a, increases (e.g., in detectability).

As a result, the reliability of detecting the IR signal coming through the panel 111 is improved.

Meanwhile, when the display 101 of the display apparatus 100 according to an embodiment is actualized by the LCD and includes the LCD panel 111 and the backlight unit 112, the backlight unit 112 is provided on the opposite side of the screen 111a of the panel 111 like the IR sensor 102 because the backlight unit 112 emits light toward the back of the panel 111. In this case, the IR sensor 102 may be influenced by the light emitted from the backlight unit 112. In other words, the light emitted from the backlight unit 112 may act as noise to the IR sensor 102. To prevent (or minimize) the noise and improve the reliability of the IR sensor 102, the processor 103 may control the light emitted from the backlight unit 112 to decrease in intensity or quantity. In this regard, descriptions will be made with reference to FIGS. 9 and 10. For convenience of description, the descriptions will be made with respect to only the intensity of the light below, but may be also applied with respect to the quantity of light.

Figure 9:
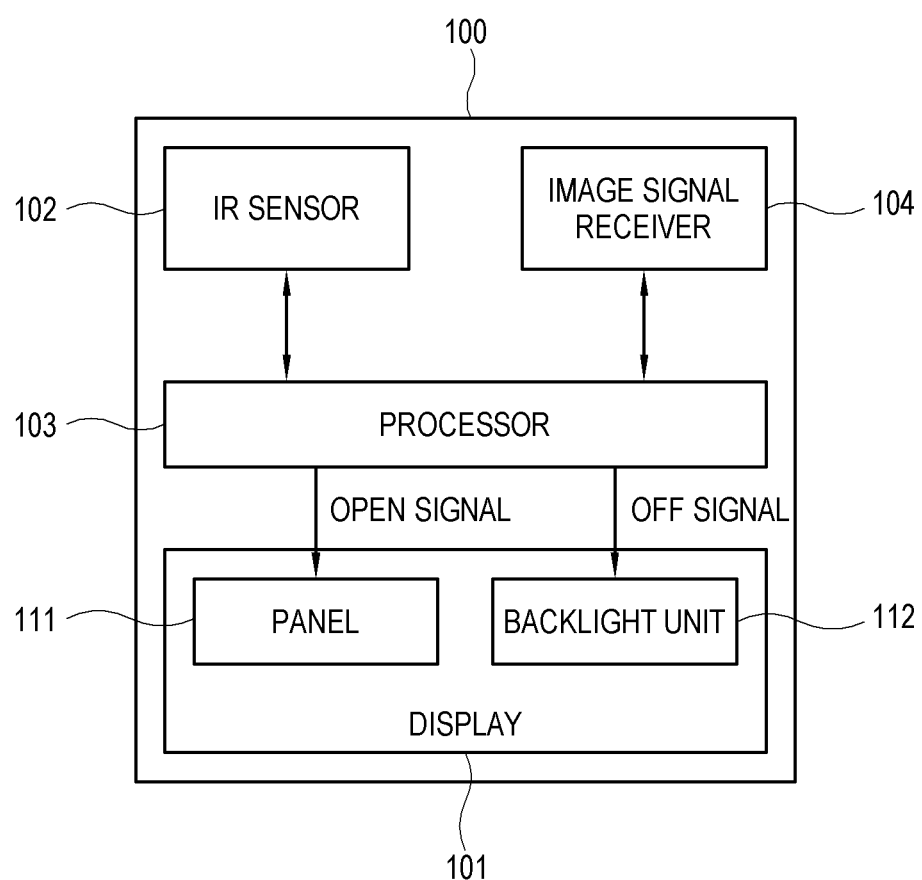
FIGS. 9 and 10 illustrate an example of a method by which a processor of a display apparatus according to an embodiment controls a backlight unit.
Figure 10:
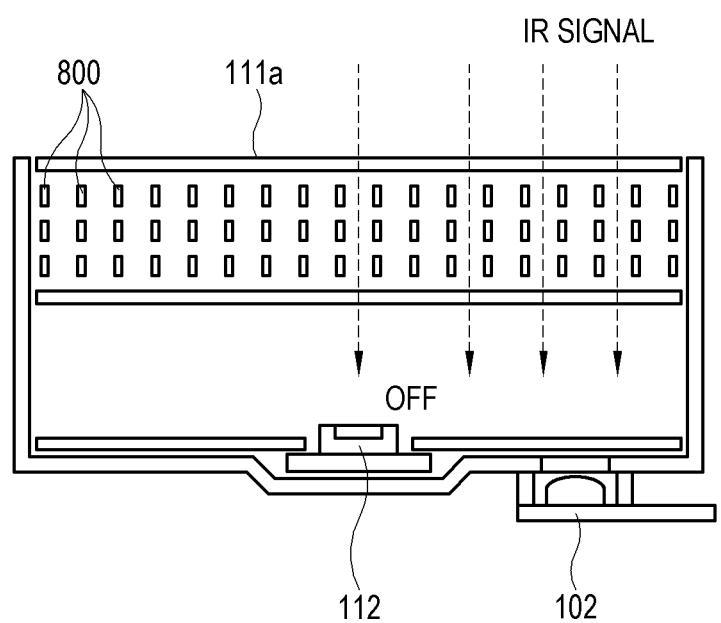

FIGS. 9 and 10 illustrate an example of a method by which the processor 103 controls the light emitted from the backlight unit 112 to decrease in intensity when the display apparatus 100 according to an embodiment is actualized by the LCD and includes the LCD panel 111 and the backlight unit 112. When the IR sensor 102 detects the IR signal passing through the panel 111, the processor 103 of the display apparatus 100 controls the panel 111 to switch over to the second state having higher light transmissivity by transmitting the OPEN signal to the panel 111. Here, the processor 103 further independently controls the backlight unit 112 to emit light with decreased intensity. As an example of this method, the processor 103 may transmit a signal for stopping power supplied to the backlight unit 112 to the backlight unit 112 (hereinafter, referred to as an "OFF" signal). In this case, the backlight unit 112 does not emit light, so that the IR sensor 102 can more accurately detect the IR signal without noise caused by the light emitted from the backlight unit 112. However, the method of controlling the backlight unit 112 to emit light with decreased intensity is not limited to the foregoing example of stopping the power supplied to the backlight unit 112. Alternatively, the method may also include a method of reducing voltage applied to the backlight unit 112 to decrease (e.g., slightly decrease) the intensity of the light, or the like.

Thus, the reliability of detecting the IR signal passing through the panel 111 is improved.

As an example of the method by which the processor 103 controls the panel 111 to switch over from the first state to the second state, when (e.g., based on) the OPEN signal is transmitted to the panel 111 so that the panel 111 can be controlled to switch over from the first state to the second state, the screen of the panel 111 displays no images. Therefore, a relatively long time, for which the processor 103 controls the panel 111 by transmitting the OPEN signal to the panel 111 so that the panel 111 can switch over from the first state to the second state, may have an effect on displaying an image in the display apparatus 100. For example, a user may recognize a section of no images while the display apparatus is displaying content. To prevent this, an embodiment will be described with reference to FIGS. 11 and 12.

Figure 11:
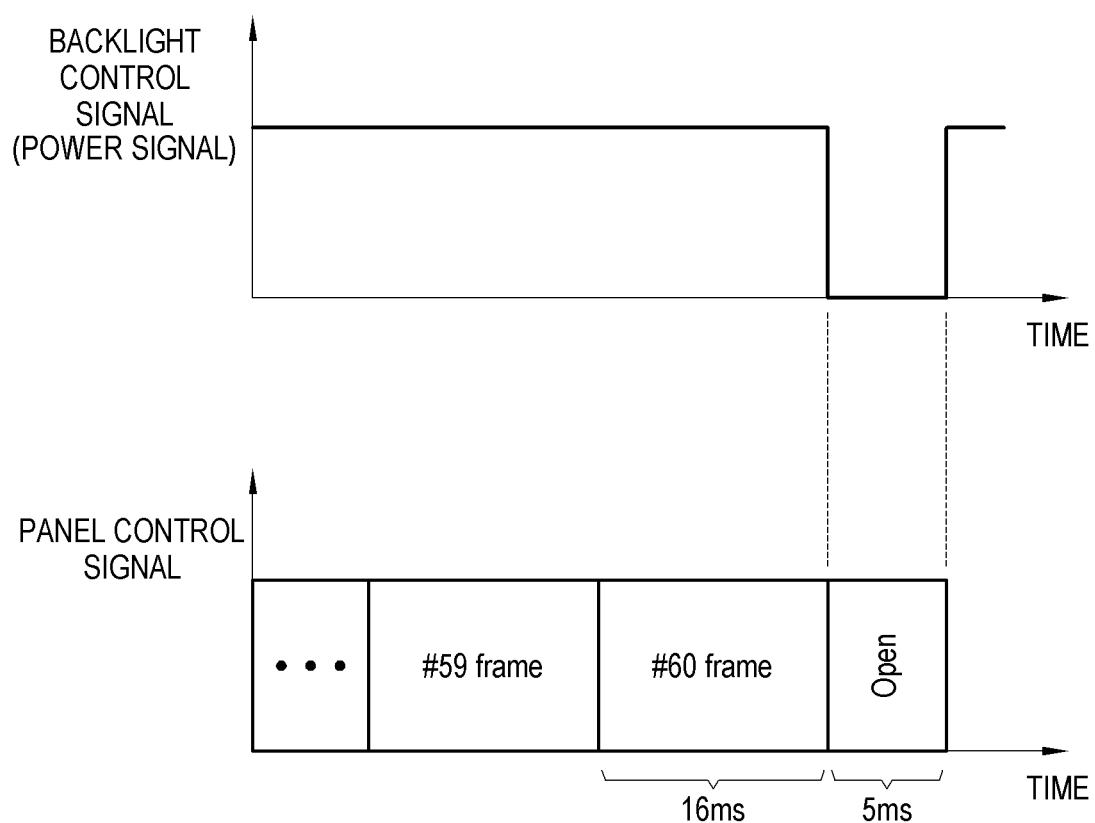
FIGS. 11 and 12 illustrate another example of a method by which a processor of a display apparatus according to an embodiment controls a panel and/or a backlight unit.
Figure 12:
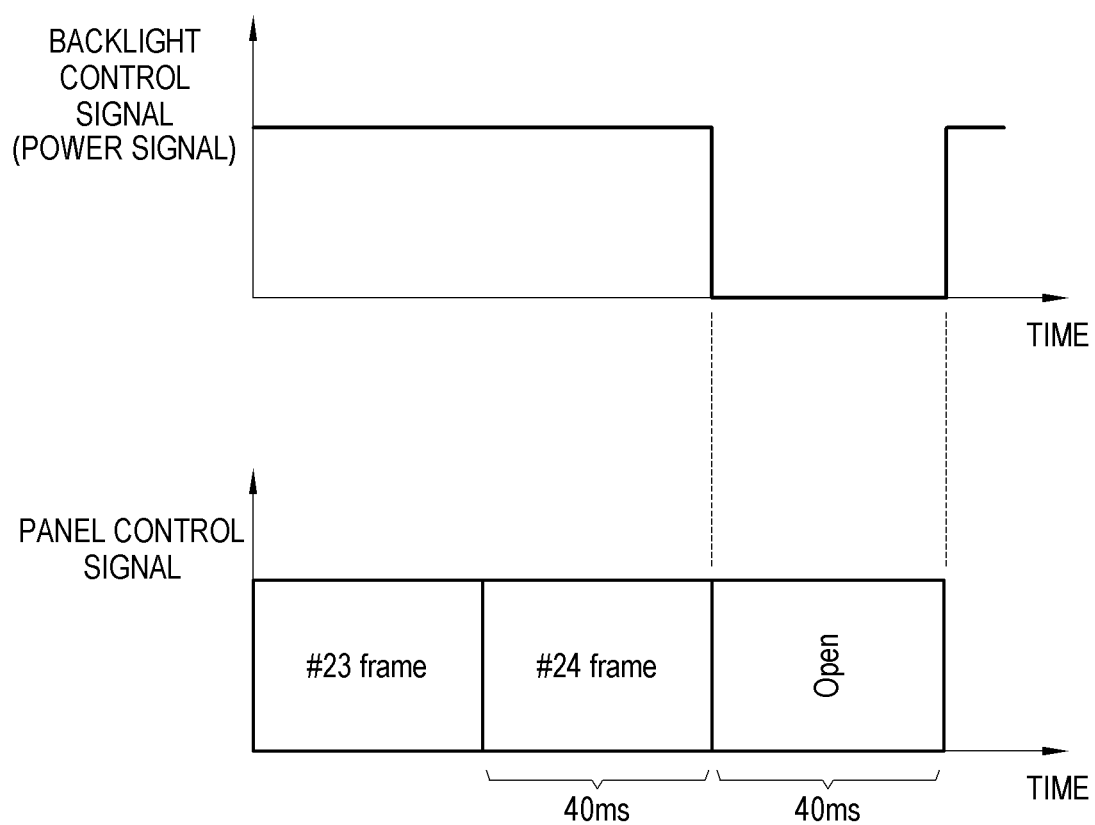

FIGS. 11 and 12 illustrate another example of a method by which the processor 103 of the display apparatus 100 according to an embodiment controls the panel 111 and/or the backlight unit 112. According to this embodiment, when the processor 103 transmits the OPEN signal or the like to the panel 111 so that the panel 111 can be controlled to switch over from the first state to the second state, and/or when the processor 103 transmits the OFF signal or the like to the backlight unit 112 so that the backlight unit 112 can be controlled to decrease the intensity of the light, the processor 103 may perform the corresponding control for a predetermined period of time corresponding to a frame rate of an image. For convenience of description, the foregoing controls for the panel 111 and the backlight unit 112 will be respectively referred to as "panel control based on the OPEN signal" and "backlight control based on the OFF signal," and it will be described that both the panel control based on the OPEN signal and the backlight control based on the OFF signal are performed at a same time. However, the panel control based on the OPEN signal and the backlight control based on the OFF signal are independent of each other.

Therefore, one or more other embodiments are not limited to performing both the controls at the same time, and only one of the controls may be performed or the controls may be performed in sequence.

As shown in FIG. 11, when an image displayed on a screen has a frame rate of 60 frames per second, i.e., when 60 image frames are processed per second and displayed on the screen, time taken in displaying one image frame on the screen is about 16 ms. In this case, the processor 103 may perform the panel control based on the OPEN signal and the backlight control based on the OFF signal for a predetermined period of time corresponding to the frame rate of the image, for example, for 5 ms shorter than 16 ms corresponding to the frame rate of the image as shown in FIG. 11. Further, the panel control based on the OPEN signal and the backlight control based on the OFF signal may be carried out after the image frames to be displayed for 1 second are all displayed on the screen. For example, after the process and display of the 59th frame and the 60th frame are finished as shown in FIG. 11, the processor 103 may carry out the panel control based on the OPEN signal and the backlight control based on the OFF signal. However, there are no limits to the timings of the panel control based on the OPEN signal and the backlight control based on the OFF signal.

Alternatively, as shown in FIG. 12, when an image displayed on the screen has a frame rate of 24 frames per second, i.e., when 24 image frames are processed per second and displayed on the screen, time taken in displaying one image frame on the screen is about 40 ms. In this case, the processor 103 may perform the panel control based on the OPEN signal and the backlight control based on the OFF signal for a predetermined period of time corresponding to the frame rate of the image, for example, for 40 ms equal to time corresponding to the frame rate of the image as shown in FIG. 12. Further, the panel control based on the OPEN signal and the backlight control based on the OFF signal are performed after the image frames to be displayed for 1 second are all displayed on the screen, i.e., after the process and display of the $23^{rd}$ frame and the $24^{th}$ frame are finished as shown in FIG. 12.

Because no images are displayed on the screen of the panel while the panel control based on the OPEN signal and the backlight control based on the OFF signal are being carried out, a longer time taken to perform the panel control based on the OPEN signal and the backlight control based on the OFF signal may have more effects on a user's recognition with regard to an image displayed on the display apparatus. Between FIG. 11 and FIG. 12, the number of frames processed per second, i.e., the frame rate, of FIG. 12 is more decreased than that of FIG. 11, whereas the time taken in performing the panel control based on the OPEN signal and the backlight control based on the OFF signal in FIG. 12 is more increased than that in FIG. 11. However, in this embodiment, time taken in both FIG. 11 and FIG. 12 to perform the panel control based on the OPEN signal and the backlight control based on the OFF signal is made to correspond to the frame rate of the image. For example, the panel control based on the OPEN signal and the backlight control based on the OFF signal are carried out for a time shorter than the frame rate of the image or for a time equal to the frame rate of the image, thereby having no effects on a user's recognition with respect to an image displayed on the display apparatus 100.

Thus, the IR signal is detected through the IR sensor 102 by controlling the panel 111 and/or the backlight unit 112 in consideration of the frame rate of the image, without having effects on a user's recognition with respect to an image displayed on the display apparatus 100.

Meanwhile, the display apparatus 100 according to an embodiment is to continuously detect the IR signal based on a user's input to the remote controller 200, which will be described in detail with reference to FIG. 13.

Figure 13:
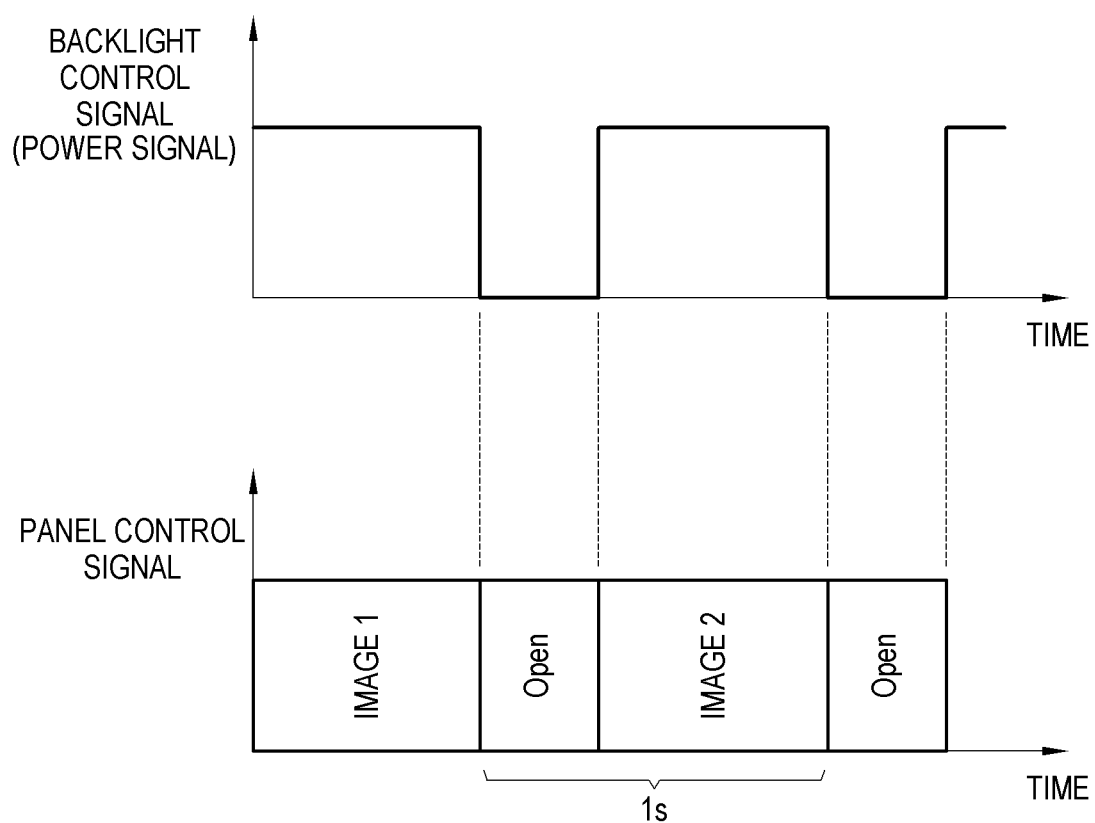
FIG. 13 illustrates still another example of a method by which a processor of a display apparatus according to an embodiment controls a panel and/or a backlight unit.

FIG. 13 illustrates still another example of a method by which the processor 103 of the display apparatus 100 according to an embodiment controls the panel 111 and/or the backlight unit 112. The processor 103 according to the present embodiment controls the panel 111 to switch over from the first state to the second state, or controls the backlight unit 112 to decrease the intensity of the emitted light on a predetermined cycle. For example, the processor 103 may perform the panel control based on the OPEN signal and the backlight control based on the OFF signal on a predetermined cycle. FIG. 13 shows an example in which the processor 103 carries out the panel control based on the OPEN signal and the backlight control based on the OFF signal on a cycle of 1 second.

Thus, the IR sensor 102 can continuously detect the IR signal emitted toward the display apparatus 100 even though the IR sensor 102 is placed in the interior of the display apparatus 100.

As described above, while the image is being displayed on the screen of the display apparatus 100, the transmissivity of the IR signal passing through the panel 111 may be low thereby causing the IR sensor 102 to inaccurately detect the IR signal. Therefore, according to another embodiment described below with reference to FIG. 14, the IR sensor 102 does not constantly operate, but operates only when the panel 111 has relatively high light transmissivity, thereby reducing power consumption in the display apparatus 100 while maintaining a substantial efficiency of detecting the IR signal.

Figure 14:
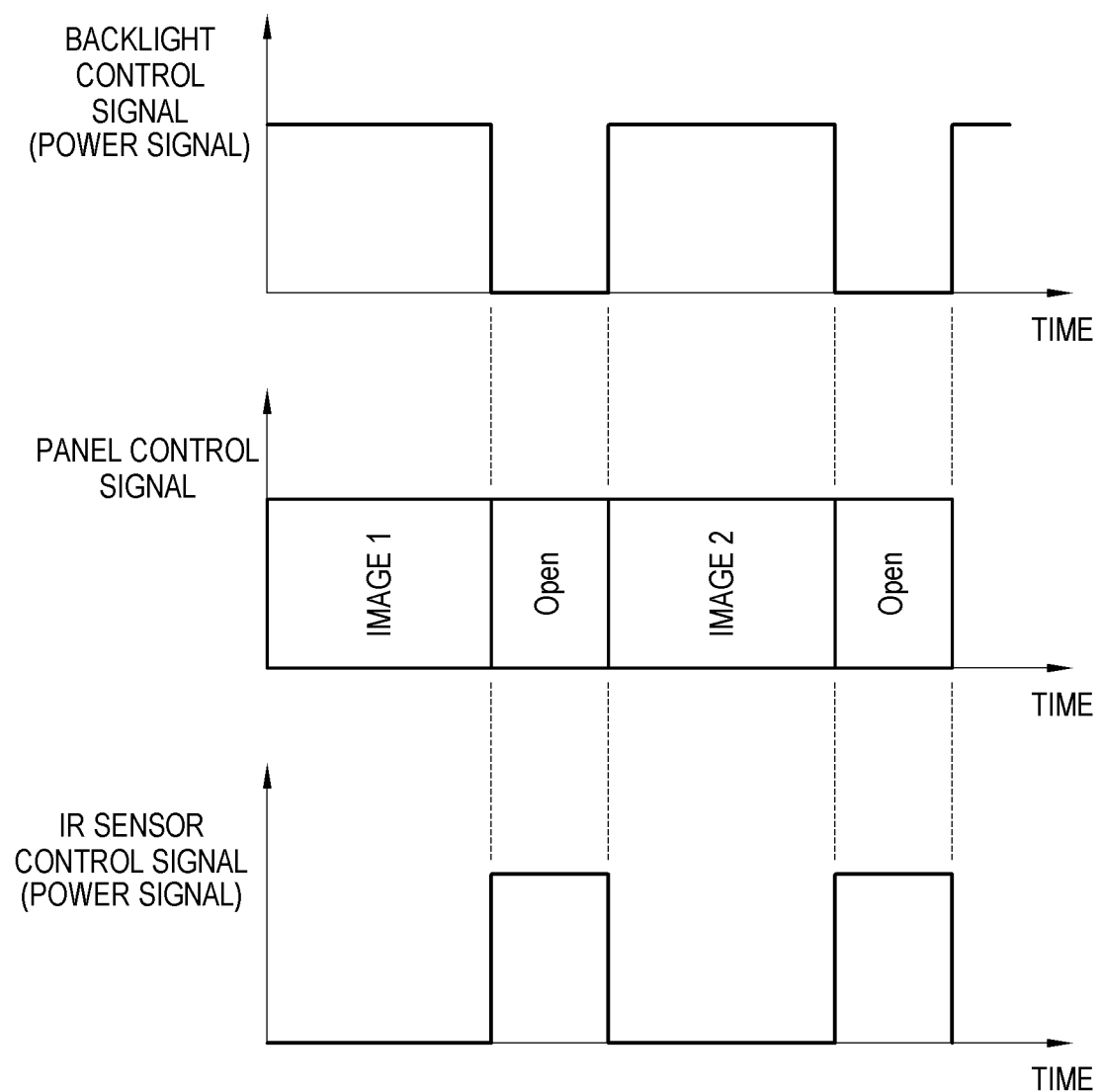
FIG. 14 illustrates yet another example of a method by which a processor of a display apparatus according to an embodiment controls a panel and/or a backlight unit.

FIG. 14 illustrates yet another example of a method by which the processor 103 of the display apparatus 100 according to an embodiment controls the panel 111 and/or the backlight unit 112. Referring to FIG. 14, the processor 103 may control power supply to the IR sensor 102 so that the IR sensor 102 does not always receive power regardless of a control signal for the panel 111, but only when the panel 111 is in a state of relatively high light transmissivity, for example, only while the panel control is being performed based on the OPEN signal. When the panel control based on the OPEN signal and/or the backlight control based on the OFF signal are carried out, the control of the power supply to the IR sensor 102 is also performed simultaneously with such control(s).

Thus, the IR sensor 102 can detect the IR signal emitted to the display apparatus 100 even though the IR sensor 102 is placed in the interior of the display apparatus 100, while also reducing power consumption in the display apparatus 100.

Meanwhile, the foregoing control for the panel 111 or the backlight unit 112 (for example the panel control based on the OPEN signal or the backlight control based on the OFF the signal) may be applied to the whole screen or to only a partial screen or area of the panel 111. For example, when the panel 111 is controlled, the processor 103 may control a first region of the panel to display an image based on an image signal, and control a second region of the panel to be subjected to the panel control based on the OPEN signal, thereby allowing the IR sensor 102 detect the IR signal through the second region. Here, the second region may have any shape as long as it can correspond to a part of the screen of the panel 111. Further, the IR sensor 102 may be placed at a location corresponding to the second region. Moreover, the IR sensor 102 may be configured with a plurality of IR sensors, including a first IR sensor corresponding to the first region, and a second IR sensor corresponding to the second region.

In addition, the processor 103 may perform the control based on the OPEN signal with regard to only a part of the screen of the panel 111 as described above, and/or perform control of the backlight unit 112 to correspond to the part of the screen. For example, when the processor 103 controls the first region of the panel to display an image based on an image signal and controls the second region of the panel to be subjected to the panel control based on the OPEN signal, the processor 103 may simultaneously supply power to a region of the backlight unit 112 corresponding to the first region of the panel but perform control based on the OFF signal with respect to a region of the backlight unit 112 corresponding to the second region of the panel (so-called "backlight local dimming"). Even in this case, the IR sensor 102 is disposed in a location corresponding to the region of the backlight unit 112 corresponding to the second region of the panel 111, thereby preventing the turned-on backlight unit 112 corresponding to the first region of the panel 111 from providing noise to the IR sensor 102. To this end, the IR sensor 102 may be configured with the plurality of IR sensors including the first IR sensor corresponding to the first region and the second IR sensor corresponding to the second region.

Thus, only a partial region of the panel 111 may be designed as a region for detecting the IR signal, thereby improving a degree of freedom in designing the display apparatus 100.

Meanwhile, the foregoing embodiment shows that the controls of the panel 111 and the backlight unit 112 (for example, the panel control based on the OPEN signal and the backlight control based on the OFF the signal) are performed for a predetermined period of time or on a predetermined cycle. Further, according to an embodiment, a predetermined period of time or a predetermined cycle, for or on which the controls for the panel 111 and the backlight unit 112 are performed, may be adaptively adjusted according to circumstances, as will be described in detail with reference to FIG. 15.

Figure 15:
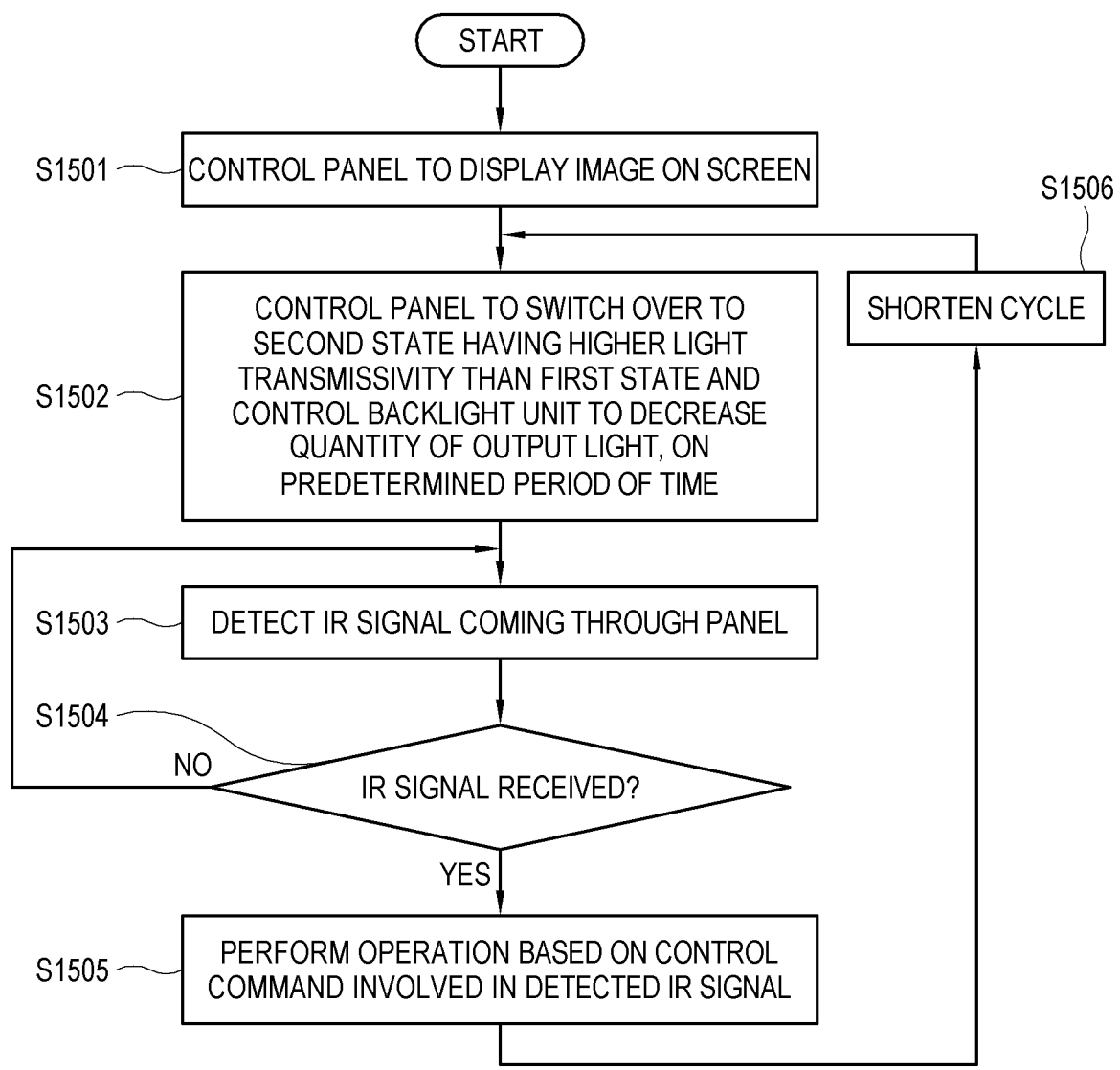
FIG. 15 illustrates still another example of a method by which a processor of a display apparatus according to an embodiment controls a panel, a backlight unit and/or an infrared (IR) sensor.

FIG. 15 illustrates still another example of a method by which the processor 103 of the display apparatus 100 according to an embodiment controls the panel 111, the backlight unit 112 and/or the IR sensor 102. The processor 103 according to the present embodiment controls an image to be displayed on the screen of the panel (S1501) while controlling the panel 111 to switch over to the second state having higher light transmissivity than the first state on a predetermined cycle, controls the backlight unit 112 to emit light with decreased intensity (S1502), and detects an IR signal passing through the panel (S1503). Therefore, the processor 103 of the display apparatus 100 can control the IR sensor 102 to detect an IR signal or the like of the remote controller 200, which is emitted toward to the screen of the panel 111, with high reliability and continuously, even though the IR sensor 102 is provided on the opposite side of the screen of the panel 111.

Then, the processor 103 identifies whether the IR signal is received or is received properly (S1504). When (e.g., based on) it is identified that the IR signal is received or is received properly, the processor 103 performs operation based on a control command involved in the detected IR signal (S1505), and decreases the predetermined cycle on which the panel control and the backlight control are performed (S1506). On the other hand, when it is identified that the IR signal is not received or is not received properly, the processor 103 carries out the panel control and the backlight control on the existing cycle and performs control for detecting the IR signal.

The reason why the predetermined cycle, on which the panel control and the backlight control are performed, is decreased when the reception of the IR signal is identified is because a user is likely to successively press a button of the remote controller 200 after using the remote controller 200 once, and there is a need of raising the receiving sensitivity with regard to the IR signal thereafter. In other words, once the IR signal is received, it is expected that another IR signal will be received. Therefore, the sensitivity of the IR sensor 102 detecting the IR signal is increased and improved thereafter.

Because the receiving sensitivity of the IR sensor 102 is improved under the condition that the reception of the IR signal is expected, the reliability of detecting the IR signal is improved.

Meanwhile, in the foregoing embodiment, the method of decreasing the predetermined cycle, on which the panel control and the backlight control are performed, is provided as a method of improving the receiving sensitivity of the IR sensor 102. However, one or more other embodiments are not limited thereto. For example, according to another embodiment, the processor 103 may increase the time, for which the panel control and the backlight control are performed, to be longer than the existing time when the reception of the IR signal is identified, thereby improving the receiving sensitivity of the IR sensor 102. In other words, the receiving sensitivity of the IR sensor 102 may be improved by increasing an absolute amount of time for which the IR sensor 102 can detect the IR signal with high reliability. Even in this case, the receiving sensitivity of the IR sensor 102 is improved under the condition that the reception of the IR signal is expected, thereby enhancing the reliability of detecting the IR signal.

Further, the foregoing embodiment describes that a predetermined period of time or a predetermined cycle for or on which the controls for the panel 111 and the backlight unit 112 are performed is adjusted adaptively according to circumstances, but it is understood that one or more other embodiments are not so limited. Alternatively, for example, a predetermined period of time or a predetermined cycle for or on which the controls for the panel 111 and the backlight unit 112 are performed may be changed in response to a user's input or the like.

Meanwhile, the foregoing embodiment describes that the IR sensor 102 is provided on the opposite side of the screen of the panel 111 and operation is made based on a control command involved in an IR signal detected through the panel 111. However, the sensor included in the display apparatus 100 is not limited to the IR sensor 102, but may include any sensors capable of detecting other optical signals. For example, the display apparatus 100 may include a color sensor, an illumination sensor or the like optical sensor, and provide a function or the like for automatically performing operation based on change in color or brightness around the display apparatus 100. In other words, the foregoing embodiments regarding the IR sensor 102 for detecting the IR signal are also applicable to the color sensor, the illumination sensor or the like optical sensor capable of detecting an optical signal around the display apparatus 100. In other words, even though the optical sensor is provided on the opposite side of the screen of the panel, the display apparatus 100 carries out a control command based on an optical signal passing through the panel 111 and detected by the optical sensor.

When the display apparatus 100 according to an embodiment includes the optical sensor, the processor 103 may perform operation based on a detection value detected by the optical sensor according to the state of the panel 111. Here, that the operation is performed based on the detection value detected by the optical sensor according to the state of the panel 111 includes that the operation is performed by analyzing and/or processing the detection value detected by the optical sensor in consideration of the state of the panel 111. For example, the processor 103 may control the state of the panel 111 so that the panel 111 can change in the light transmissivity, adjust the detection value detected by the optical sensor according to the light transmissivity of the panel 111, and perform the operation based on the adjusted detection value.

Further, when the display apparatus 100 according to an embodiment includes the optical sensor, the processor 103 may control the backlight unit 112 to adjust the quantity of light emitted from the backlight unit 112, and perform operation based on the detection value detected by the optical sensor according to the state of the backlight unit 112. Here, that the operation is performed based on the detection value detected by the optical sensor according to the state of the backlight unit 112 includes that the operation is performed by analyzing and/or processing the detection value detected by the optical sensor in consideration of the state of the backlight unit 112.

Moreover, when the display apparatus 100 according to an embodiment includes the optical sensor, the optical sensor may operate in various modes for detecting not only color, color temperature and illumination outside the display apparatus 100, i.e., outside the housing 105, but also color, color temperature and illumination of the panel 111 and color, color temperature and illumination inside the display apparatus 100.

Figure 16:
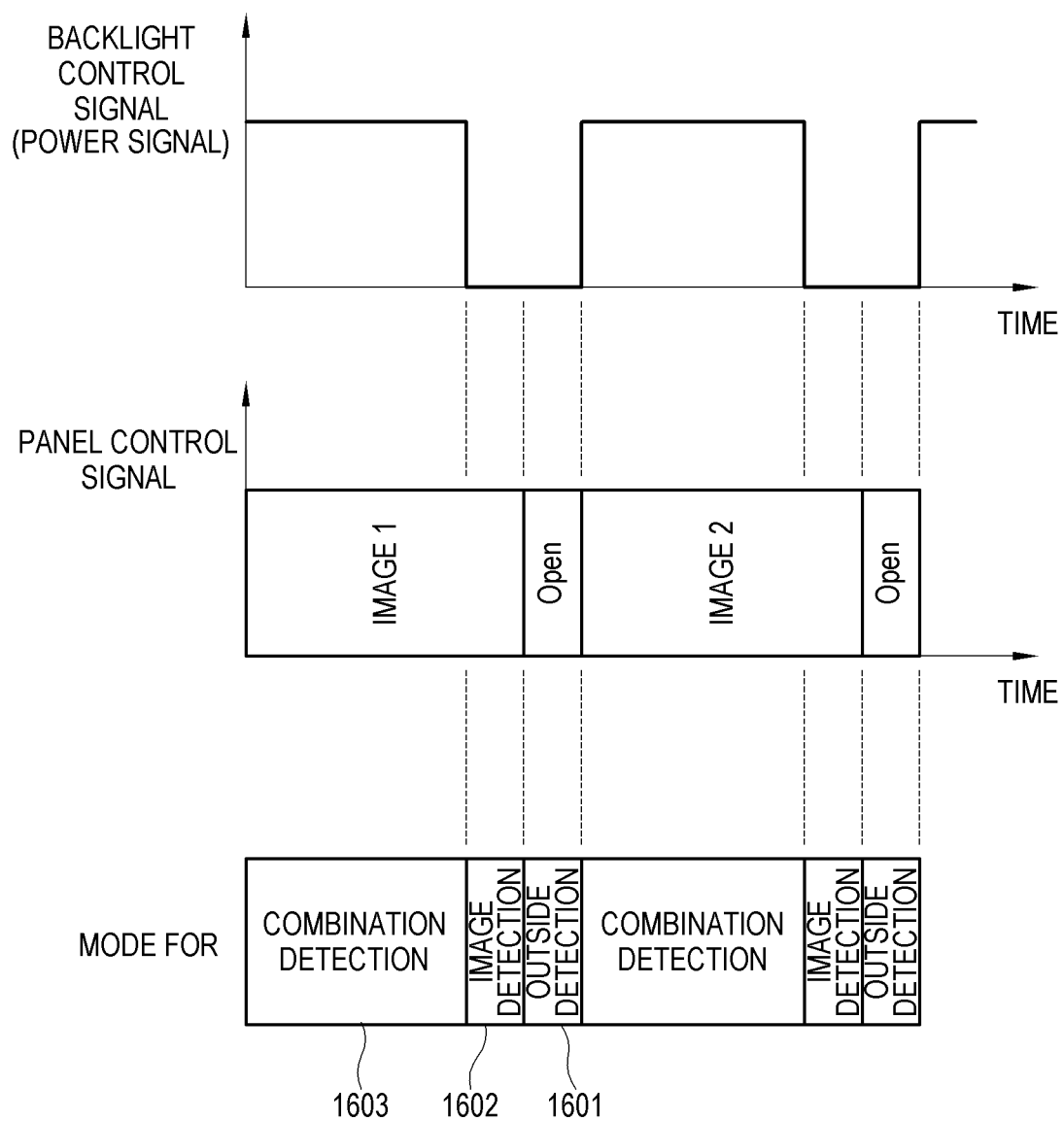
FIG. 16 illustrates a schematic operation of a display apparatus according to still another embodiment.

Referring to FIG. 16, the display apparatus 100 according to an embodiment may, for example, operate in an outside detection mode 1601, an image detection mode 1602, and a combination detection mode 1603.

In the outside detection mode 1601, the processor 103 controls the panel 111 to switch over from the first state to the second state having higher light transmissivity than the first state and controls the backlight unit 112 to decrease the quantity of the emitted light, thereby identifying the detection value detected by the optical sensor as the detection value of the light outside the display apparatus 100 and performing operation based on the identification. For example, a case in which the panel control based on the OPEN signal and the backlight control based on the OFF signal are performed at a time may correspond to the outside detection mode 1601. When the display apparatus 100 operates in the outside detection mode 1601, information detected through the optical sensor positioned inside the display apparatus 100 generally refers to optical information based on light from the outside of the display apparatus 100. In the outside detection mode 1601, change in illumination and/or color inside the display apparatus 100 is correctly measurable without being affected by the backlight unit 112 and a panel image, and the receiving sensitivity to the IR signal from the outside of the display apparatus 100 is improved to thereby enhance a long-distance reception and a success rate.

In the image detection mode 1602, the processor 103 controls the panel 111 to display an image on the screen thereof and controls the backlight unit 112 to decrease the quantity of the emitted light, thereby identifying the detection value obtained by the optical sensor as the detection value with respect to the light from the outside of the display apparatus 100 and the image displayed on the panel 111 and performing operation based on the identification. For example, a case where only the backlight control based on the OFF signal is performed and an image signal is transmitted to the panel 111 may correspond to the image detection mode 1602. When the display apparatus 100 operates in the image detection mode 1602, information detected through the optical sensor positioned inside the display apparatus 100 generally refers to optical information based on light from the image itself displayed on the panel 111.

In the combination detection mode 1603, the processor 103 controls the panel 111 to display an image on the screen thereof and controls the backlight unit 112 not to decrease the quantity of the emitted light, thereby identifying the detection value obtained by the optical sensor as the detection value about the light from the outside and inside of the display apparatus 100 and the image displayed on the panel 111 and performing operation based on the identification. For example, a case where an image signal is transmitted to the panel 111 and power is supplied to the backlight unit 112 may correspond to the combination detection mode 1603. When the display apparatus 100 operates in the combination detection mode 1603, information detected through the optical sensor positioned inside the display apparatus 100 generally refers to optical information based on a combination of information about light from the outside of the display apparatus 100 and information about light from the inside of the display apparatus 100 and/or the image displayed on the panel 111.

Thus, the operation may be performed based on the optical information obtained with respect to the light from the interior of the display apparatus 100 and/or the image displayed on the panel 111 as well as the optical information obtained with respect to the light from the exterior of the display apparatus 100.

Further, among the embodiments described above, embodiments in which the optical sensor is placed on the opposite side of the screen of the panel 111 is less affected by an exterior object than a case in which the optical sensor is placed in an outer lower end or the like of the display apparatus 100. Moreover, even when the optical sensor is placed to detect both the interior and the exterior of the display apparatus 100, an effect from the interior is minimized, thereby improving accuracy of exterior detection.

Additionally, the processor 103 of the display apparatus 100 according to an embodiment may improve the accuracy of the detection of the light from the interior/exterior of the display apparatus 100 by a method of correcting the detection value obtained in one among plural modes, e.g., the outside detection mode 1601, the image detection mode 1602, and the combination detection mode 1603, based on the detection value obtained in another mode. For example, the processor 103 may correct a second detection value obtained by the optical sensor while no images are displayed on the screen of the panel 111, based on a first detection value obtained by the optical sensor while an image is displayed on the screen of the panel 111.

Below, an example of correcting the detection value will be described in detail. The optical information detected in the outside detection mode 1601 refers to optical information about the light from the exterior of the display apparatus 100. The optical information detected in the image detection mode 1602 is obtained by combining the optical information about the light from the image displayed on the panel 111 to the optical information about the light from the exterior of the display apparatus 100. The optical information detected in the combination detection mode 1603 is obtained by combining the optical information about the light from the image displayed on the panel 111 and the optical information about the light emitted from the backlight unit 112 to the optical information about the light from the exterior of the display apparatus 100. Therefore, when the detection value detected in the image detection mode 1602 is corrected based on the detection value detected in the outside detection mode 1601, the optical information about only the light from the image displayed on the panel 111 may, for example, be obtained by subtracting the detection value detected in the outside detection mode 1601 from the detection value detected in the image detection mode 1602. Likewise, the optical information about only the light emitted from the backlight unit 112 may for example be obtained by subtracting the detection value detected in the image detection mode 1602 from the detection value detected in the combination detection mode 1603. Similarly, combination between the optical information about the light from the image displayed on the panel 111 and the optical information about the light emitted from the backlight unit 112, i.e., only the optical information caused by the internal elements such as the panel 111 of the display apparatus 100 and the backlight 112, may for example be obtained by subtracting the detection value detected in the outside detection mode 1601 from the detection value detected in the combination detection mode 1603. Thus, it is possible to further improve the accuracy of the optical information about the light from the interior/exterior of the display apparatus 100.

As described above, according to embodiments, an optical sensor may be placed in the interior of a display apparatus, and operation may be performed based on light detected from the interior and exterior of the display apparatus or from the panel through the optical sensor even though the optical sensor is placed in the interior of the display apparatus.

Although a few embodiments have been described above with reference to the accompanying drawings, it will be appreciated by a person having ordinary skill in the art that features of embodiments may be combined and embodiments may be actualized in different forms without changing their technical concept or essential features. Therefore, the foregoing embodiments are all for illustrative purposes only and should not be construed as limiting the disclosure.

What is claimed is:

1. A display apparatus comprising:
a display comprising a panel configured to display an image on a screen;
an optical sensor placed on a side of the panel opposite to the screen of the panel, and configured to detect an optical signal; and
a processor configured to:
control the panel to display the image on the screen, and perform an operation based on a state of the panel and a detection value obtained by the optical sensor; and
based on a first detection value obtained by the optical sensor while the panel displays the image on the screen, correct a second detection value obtained by the optical sensor while the panel displays no images on the screen.

2. The display apparatus according to claim 1, wherein: the display further comprises a backlight unit configured to output light to the panel; and
the processor is further configured to control the backlight unit to change a quantity of light output from the backlight unit, and to perform the operation based on a state of the backlight unit and the detection value obtained by the optical sensor.

3. The display apparatus according to claim 2, wherein the processor is further configured to identify the detection value obtained by the optical sensor as a detection value about light from an exterior of the display apparatus, based on the panel controlled to switch over from a first state to a second state having higher light transmissivity than the first state and the backlight unit controlled to decrease the quantity of the output light when the optical signal is detected, and to perform the operation based on the identification.

4. The display apparatus according to claim 3, wherein:
the optical sensor comprises an infrared (IR) sensor; and
the processor is further configured to perform the operation according to an IR signal detected by the IR sensor, based on the panel controlled to switch over to the second state and the backlight unit controlled to decrease the quantity of the output light.

5. The display apparatus according to claim 4, wherein the processor is further configured to control the panel to switch over from the first state to the second state and to control the backlight unit to decrease the quantity of the output light, for a predetermined period of time corresponding to a frame rate of the image displayed on the screen.

6. The display apparatus according to claim 5, wherein the processor is further configured to increase the predetermined period of time based on the IR sensor detecting the IR signal.

7. The display apparatus according to claim 4, wherein the processor is further configured to control the panel to switch over from the first state to the second state and to control the backlight unit to decrease the quantity of the output light, on a predetermined cycle.

8. The display apparatus according to claim 7, wherein the processor is further configured to shorten the predetermined cycle based on the IR sensor detecting the IR signal.

9. The display apparatus according to claim 4, wherein the processor is further configured to control a first region of the panel to display the image based on an image signal, and to control a second region of the panel to switch over from the first state to the second state while the first region displays the image in the first state.

10. The display apparatus according to claim 2, wherein the processor is further configured to identify the detection value obtained by the optical sensor as a detection value about light from an exterior of the display apparatus and light from the image, based on the panel controlled to display the image on the screen thereof and the backlight unit controlled to decrease the quantity of the output light when the optical signal is detected, and to perform the operation based on the identification.

11. The display apparatus according to claim 2, wherein the processor is further configured to identify the detection value obtained by the optical sensor as a detection value about light from an exterior and an interior of the display apparatus and light from the image, based on the panel controlled to display the image on the screen thereof and the backlight unit controlled not to decrease the quantity of the output light when the optical signal is detected, and to perform the operation based on the identification.

12. The display apparatus according to claim 1, wherein the processor is further configured to control the state of the panel to change light transmissivity of the panel, to correct the detection value obtained by the optical sensor based on the light transmissivity of the panel, and to perform the operation based on the corrected detection value.

13. A method of controlling a display apparatus comprising a display with a panel, the method comprising:
controlling the panel to display an image on a screen;
performing an operation based on a state of the panel and a detection value obtained by an optical sensor placed on a side of the panel opposite to the screen of the panel; and
based on a first detection value obtained by the optical sensor while the panel displays the image on the screen, correcting a second detection value obtained by the optical sensor while the panel displays no images on the screen.

14. The method according to claim 13, wherein the performing the operation comprises controlling to change a quantity of light output from a backlight unit of the display, and performing the operation based on the state of the panel, the detection value obtained by the optical sensor and a state of the backlight unit.

15. The method according to claim 14, wherein the performing the operation based on the state of the panel, the detection value, and the state of the backlight unit comprises controlling the state of the panel to change light transmissivity of the panel, correcting the detection value obtained by the optical sensor based on the light transmissivity of the panel, and performing the operation based on the corrected detection value.

16. The method according to claim 14, wherein the performing the operation based on the state of the panel, the detection value, and the state of the backlight unit comprises identifying the detection value obtained by the optical sensor as a detection value about light from an exterior of the display apparatus, based on the panel controlled to switch over from a first state to a second state having higher light transmissivity than the first state and the backlight unit controlled to decrease the quantity of the output light, and performing the operation based on the identification.

17. The method according to claim 14, wherein the performing the operation based on the state of the panel, the detection value, and the state of the backlight unit comprises identifying the detection value obtained by the optical sensor as a detection value about light from an exterior of the display apparatus and light from the image, based on the panel controlled to display the image on the screen thereof and the backlight unit controlled to decrease the quantity of the output light, and performing the operation based on the identification.

18. The method according to claim 14, wherein the performing the operation based on the state of the panel, the detection value, and the state of the backlight unit comprises identifying the detection value obtained by the optical sensor as a detection value about light from an exterior and an interior of the display apparatus and light from the image, based on the panel controlled to display the image on the screen thereof and the backlight unit controlled not to decrease the quantity of the output light, and performing the operation based on the identification.

19. A non-transitory computer-readable recording medium having recorded thereon at least one instruction executable by a processor to perform a method of controlling a display apparatus, the method comprising:
controlling a panel of the display apparatus to display an image on a screen;
performing an operation based on a state of the panel and a detection value obtained by an optical sensor placed on a side of the panel opposite to the screen of the panel;
based on a first detection value obtained by the optical sensor while the panel displays the image on the screen, correcting a second detection value obtained by the optical sensor while the panel displays no images on the screen.

* * * * *